(12) United States Patent
Martin (10) Patent No.: US 9,129,523 B2
(45) Date of Patent: Sep. 8, 2015

(54) METHOD AND SYSTEM FOR OBSTACLE DETECTION FOR VEHICLES USING PLANAR SENSOR DATA

(71) Applicant: Jaybridge Robotics, Inc., Cambridge, MA (US)

(72) Inventor: Bradly A. Martin, Cambridge, MA (US)

(73) Assignee: Jaybridge Robotics, Inc., Cambridge, MA (US)

(*) Notice: Subject to any disclaimer, the term of this patent is extended or adjusted under 35 U.S.C. 154(b) by 102 days.

(21) Appl. No.: 13/900,125

(22) Filed: May 22, 2013

(65) Prior Publication Data

US 2014/0350835 A1 Nov. 27, 2014

(51) Int. Cl.
| | | |
|---|---|---|
| *G08G 9/02* | (2006.01) | |
| *G01S 17/93* | (2006.01) | |
| *G01S 7/295* | (2006.01) | |
| *G01S 7/41* | (2006.01) | |
| *G01S 7/48* | (2006.01) | |
| *G01S 13/86* | (2006.01) | |
| *G01S 13/93* | (2006.01) | |

(52) U.S. Cl.
CPC . *G08G 9/02* (2013.01); *G01S 7/295* (2013.01); *G01S 7/414* (2013.01); *G01S 7/4808* (2013.01); *G01S 13/86* (2013.01); *G01S 13/931* (2013.01); *G01S 17/936* (2013.01); *G01S 2013/9367* (2013.01)

(58) Field of Classification Search
CPC ... G01S 13/93; G01S 13/931; G01S 13/9353; G01S 13/9357; G01S 13/9371; G01S 13/9375; G01S 13/9389; G01S 13/94

USPC .................. 701/301, 514; 700/255, 258, 253; 702/150
See application file for complete search history.

(56) References Cited

U.S. PATENT DOCUMENTS

| | | | |
|---|---|---|---|
| 6,055,042 A | 4/2000 | Sarangapani | |
| 6,130,639 A * | 10/2000 | Agnesina et al. | 342/169 |
| 6,515,614 B2 | 2/2003 | Sakai et al. | |
| 8,139,109 B2 | 3/2012 | Schmiedel et al. | |
| 8,605,998 B2 * | 12/2013 | Samples et al. | 382/159 |
| 8,781,643 B2 * | 7/2014 | Naka | 701/1 |
| 2002/0013675 A1 | 1/2002 | Knoll et al. | |
| 2005/0165550 A1 * | 7/2005 | Okada | 701/301 |
| 2008/0243334 A1 * | 10/2008 | Bujak et al. | 701/37 |
| 2010/0020074 A1 | 1/2010 | Taborowski et al. | |
| 2010/0026555 A1 | 2/2010 | Whittaker et al. | |
| 2010/0030473 A1 * | 2/2010 | Au et al. | 701/301 |
| 2010/0114416 A1 | 5/2010 | Au et al. | |
| 2010/0305857 A1 * | 12/2010 | Byrne et al. | 701/301 |
| 2011/0262009 A1 * | 10/2011 | Duan et al. | 382/103 |
| 2012/0095619 A1 | 4/2012 | Pack et al. | |
| 2013/0070095 A1 * | 3/2013 | Yankun et al. | 348/148 |

FOREIGN PATENT DOCUMENTS

JP 2008-076390 A 4/2008

OTHER PUBLICATIONS

Fulcher, Advances in Applied Artificial Intelligence, Mar. 31, 2006, Google eBook.*

(Continued)

*Primary Examiner* — Russell Frejd
*Assistant Examiner* — Sara Nelson
(74) *Attorney, Agent, or Firm* — Rajesh Vallabh; Foley Hoag LLP (57) ABSTRACT

A computer-implemented method and system for automatically detecting an obstacle from a moving vehicle using a planar sensor mounted on the vehicle.

19 Claims, 5 Drawing Sheets

(56) References Cited

OTHER PUBLICATIONS

Lages et al., Laserscanner Innovations for Detection of Obstacles and Road, 2003, VDI-Buch.*

Nalos, LiDAR and Coordinate Systems: Journey to the Center of the Earth, Mar. 30, 2011, http://blog.safe.com/2011/03/lidar-and-coordinate-systems-journey-to-the-center-of-the-earth/.*

International Search Report and Written Opinion for PCT/US2014/038962, dated Nov. 11, 2014.

* cited by examiner

Obstacle Detections Over Time

Ground Detections Over Time

METHOD AND SYSTEM FOR OBSTACLE DETECTION FOR VEHICLES USING PLANAR SENSOR DATA

BACKGROUND

The present application generally relates to obstacle detection for vehicles using planar sensor data.

BRIEF SUMMARY OF THE DISCLOSURE

In accordance with one or more embodiments, a computer-implemented method is provided for automatically detecting an obstacle from a moving vehicle using a planar sensor mounted on the vehicle. The method includes the steps of: (a) receiving data at a computer system from the sensor, said data comprising a series of points defined by a planar coordinate system relative to the sensor where the sensor detected a return during a frame, and receiving data at the computer system indicating the vehicle's geo-referenced location and orientation; (b) identifying, by the computer system, an obstacle candidate profile from the series of points; (c) transforming, by the computer system, the obstacle candidate profile from a sensor-relative representation to a geo-referenced representation; (d) repeating steps (a) to (c) for a given number of frames; and (e) detecting, by the computer system, an obstacle when the obstacle candidate profiles in the geo-referenced representation for each of the given number of frames substantially coincide.

In accordance with one or more further embodiments, a computer system is provided, comprising at least one processor, memory associated with the at least one processor, and a program supported in the memory for automatically detecting an obstacle from a moving vehicle using a planar sensor mounted on the vehicle. The program has a plurality of instructions stored therein which, when executed by the at least one processor, cause the at least one processor to: (a) receive data from the sensor, said data comprising a series of points defined by a planar coordinate system relative to the sensor where the sensor detected a return during a frame, and receive data indicating the vehicle's geo-referenced location and orientation; (b) identify an obstacle candidate profile from the series of points; (c) transform the obstacle candidate profile from a sensor-relative representation to a geo-referenced representation; (d) repeat (a) to (c) for a given number of frames; and (e) detect an obstacle when the obstacle candidate profiles in the geo-referenced representation for each of the given number of frames substantially coincide.

DETAILED DESCRIPTION

Various embodiments disclosed herein are directed to an obstacle detection system having various possible uses including, e.g., in off-road vehicles. The obstacle detection system uses sensors having a primarily planar field-of-view (such as a LIDAR (Light Detection and Ranging or Laser Imaging Detection and Ranging) or RADAR (RAdio Detection And Ranging)) for detection of stationary obstacles in the path of a vehicle, and suppresses false detection of obstacles caused by sensor returns from terrain that is otherwise safe to traverse. The obstacle detection system inter-operates with other vehicle control modules in order to avoid collisions with obstacles by either steering around them or halting the vehicle before reaching them.

In the illustrative embodiments disclosed herein, the obstacle detection system is implemented in a driverless vehicle in off-road conditions that is designed to avoid collisions with stationary objects by analyzing data collected via an onboard LIDAR or RADAR. However, it should be understood that the system could have various other implementations including, e.g., in a manned system with an automated collision warning or avoidance system. It could also be implemented in vehicles operating on paved or other surfaces where the terrain in the operational area is sufficiently uneven so as to present challenges in distinguishing sensor returns from ground features from legitimate obstacles. In addition, the system can use a variety of sensor types other than LIDAR or RADAR for which the field of view lies primarily in a horizontal plane, with a relatively narrow vertical field-of-view including, e.g., SONAR (SOund Navigation And Ranging).

Figure 1A:
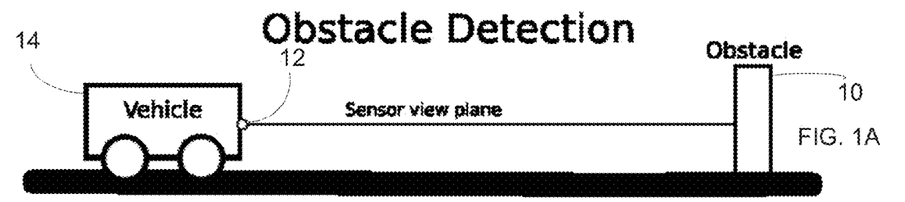
FIG. 1A is a simplified diagram illustrating detection of an obstacle by an obstacle detection system in a vehicle travelling on even terrain.
Figure 1B:
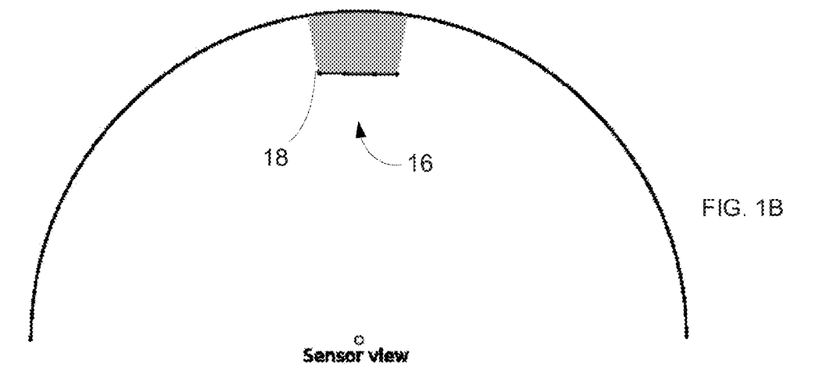
FIG. 1B is a simplified illustration of the sensor view by the obstacle detection system in FIG. 1A.

FIG. 1A illustrates detection of an obstacle 10 by a planar sensor 12 mounted rigidly on a vehicle 14 travelling on even terrain. FIG. 1B illustrates the sensor view of the obstacle 10 showing an obstacle profile 16 comprising a series of points 18 where the sensor detected a return during a sweep of the sensor. Each point 18 can be defined by a planar coordinate system such as, e.g., polar coordinates (range and bearing) or rectilinear/Cartesian coordinates, relative to the sensor.

Figure 2A:
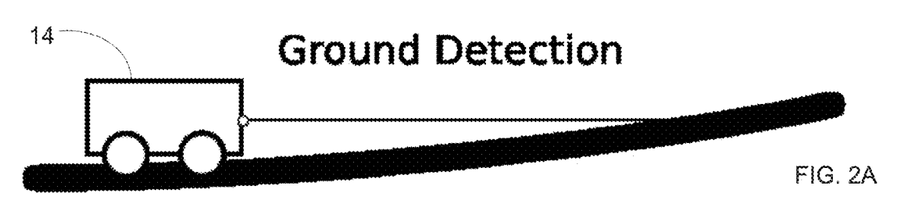
FIG. 2A is a simplified diagram illustrating ground detection by an obstacle detection system in a vehicle travelling on uneven terrain.
Figure 2B:
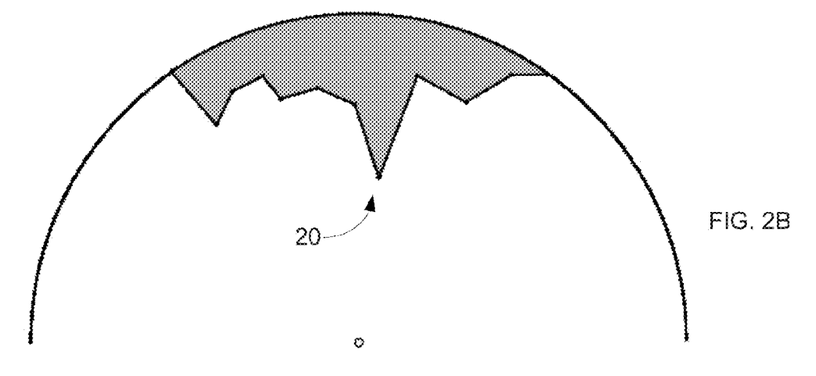
FIG. 2B is a simplified illustration of the sensor view by the obstacle detection system in FIG. 2A.

As shown in FIG. 2A, in uneven terrain, the field of view of the planar sensor 12 will often intersect the ground, due to the vehicle's pitch and roll changing as it traverses the terrain, or a hill or other traversable terrain feature rising up in front of the vehicle, resulting in detection of ground clutter having a detected profile 20 as shown in FIG. 2B.

An obstacle detection system and process in accordance with one or more embodiments takes advantage of changes in the vehicle's pitch and roll over time in order to collect information about how the sensor data varies in the vertical direction. In this way, detected targets with a mostly-vertical orientation will be classified as obstacles, whereas detections with a significantly lower angle-of-incidence with the sensor plane can be rejected as likely ground clutter.

Figure 3:
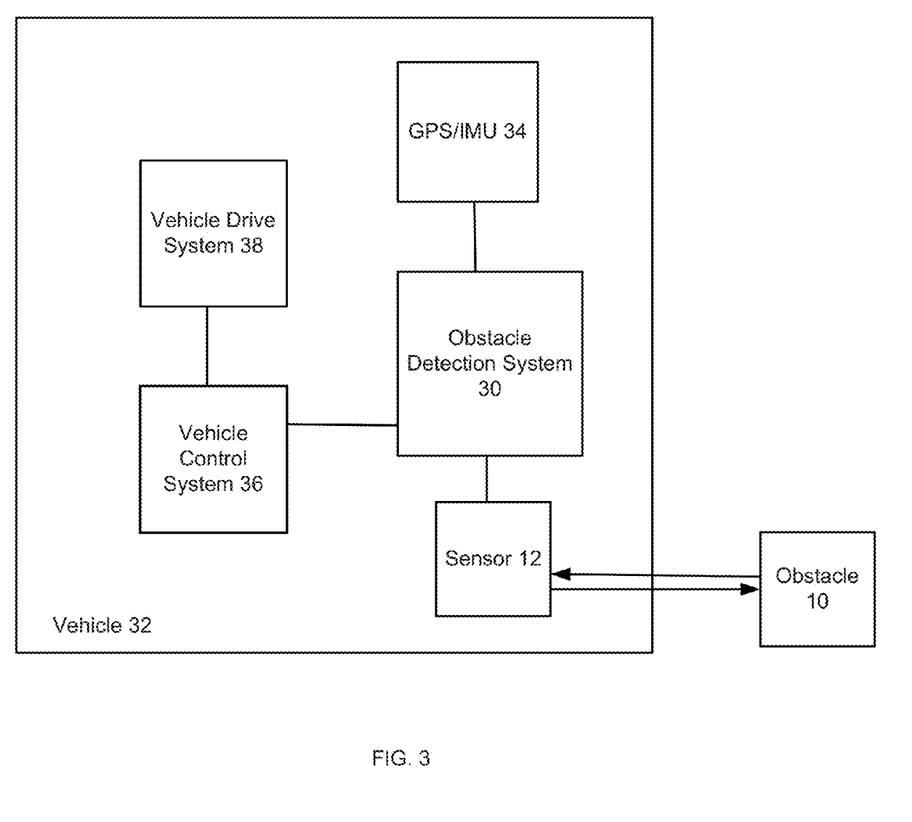
FIG. 3 is a simplified block diagram illustrating implementation of an obstacle detection system in a vehicle in accordance with one or more embodiments.

FIG. 3 is a simplified block diagram illustrating implementation of an obstacle detection system 30 in a vehicle 32 in accordance with one or more embodiments. The obstacle detection system 30, which is implemented in a computer system, receives inputs from the planar sensor 12, as well as from a GPS (Global Positioning System) and IMU (inertial measurement unit) 34. A vehicle control system 36 receives inputs from the obstacle detection system 30 to avoid collisions with obstacles 10 by operating a vehicle drive system 38 to either steer around obstacles or to halt the vehicle before reaching an obstacle. The obstacle detection system 30 is physically located within the body of the vehicle. It can be implemented, e.g., in a programmable computer that is preferably ruggedized and compacted for in-vehicle use. Alternately, the obstacle detection system 30 or portions thereof can be located outside of the vehicle, and can communicate with other vehicle systems over a wireless network.

An obstacle detection process in accordance with one or more embodiments is run once per sensor update time interval, using the inputs specified below. (The sensor update time interval comprises one sweep of the sensor or frame, and can be, e.g., 1/30th of a second.)

1. The sensor data for the current frame. This data can be expressed as any number of obstacle candidate profiles, each comprising two or more range and bearing measurements where the sensor detected a return. (The profiles can also be defined by another planar coordinate system such as rectilinear/Cartesian coordinates.)
2. The sensor's mounting location on the vehicle, and orientation (pitch, roll, yaw) relative to the vehicle. The sensor's field of view need not be entirely horizontal; for example, it may be mounted with a small pitch offset up or down. The sensor also need not necessarily be mounted facing in a forward direction.
3. The vehicle's geo-referenced location, heading, pitch, and roll. This can be derived from the onboard GPS and IMU 34, although this need not necessarily be the case. Other possible ways of obtaining this information can be, e.g., by visual reference to fiducial landmarks.

As output, the process produces a set of obstacle profiles that have been determined to represent likely obstacles to be avoided.

The sensitivity, accuracy, and run-time complexity of the process can be configured via the following parameters:

1. Correlation frame count. Larger values for this parameter will in general increase the selectivity of the process and pass fewer obstacles through to the output, at some cost in run-time complexity.
2. Correlation margin. Larger values for this parameter will in general decrease the selectivity of the process and pass more obstacles through to the output.
3. Approximation epsilon. Larger values for this parameter will decrease the run-time complexity of the process, at some cost in accuracy. The approximation step is optional.

Figure 4:
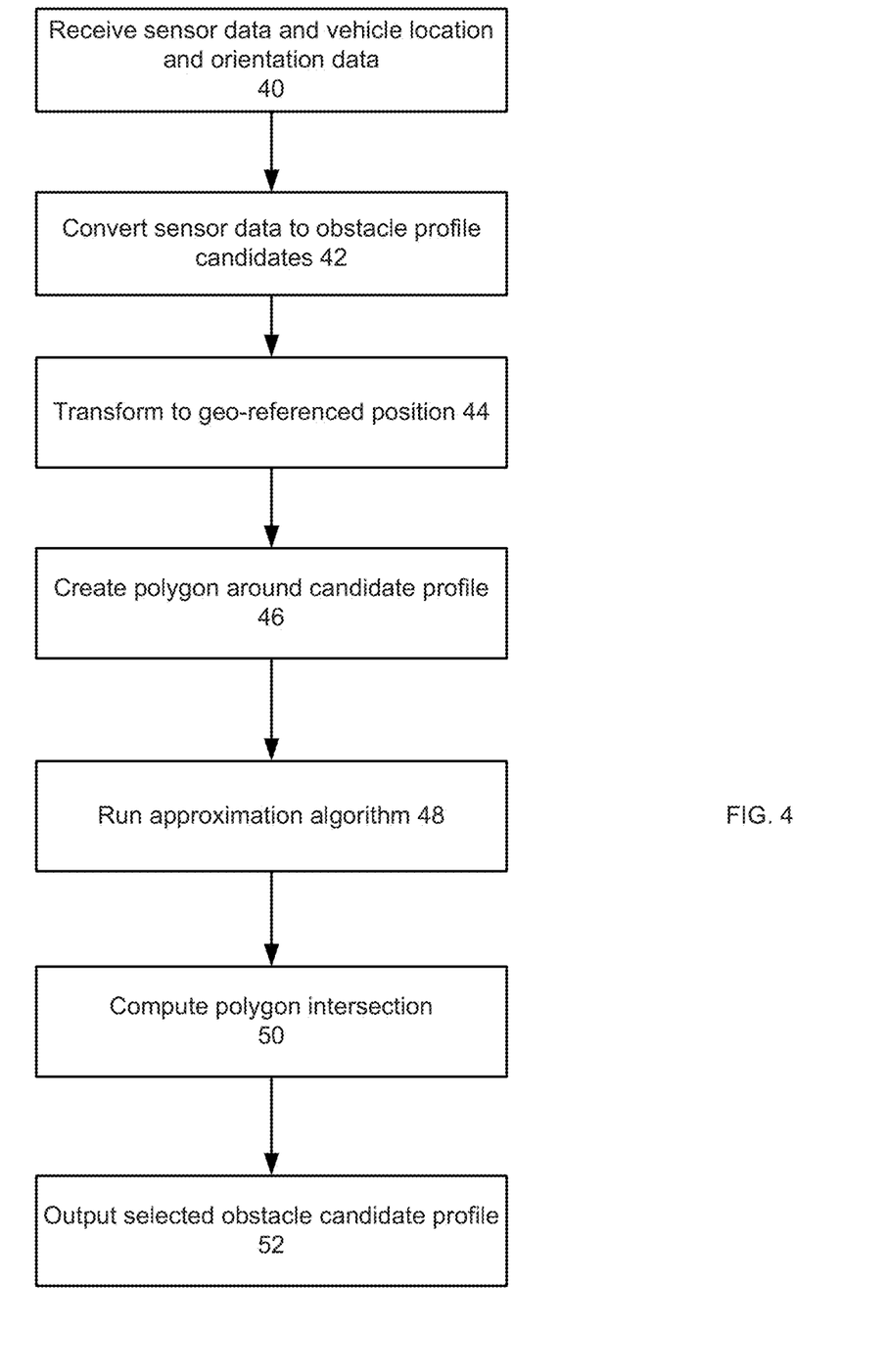
FIG. 4 is a flowchart illustrating an obstacle detection process in accordance with one or more embodiments.

A representative obstacle detection process in accordance with one or more embodiments is as follows and as illustrated in the flow chart of FIG. 4:

1. Receive sensor data for a frame interval at step 40. The sensor data comprises a series of points (defined by polar coordinates relative to the sensor) where the sensor detected a return during a sweep of the sensor. (The points can also be defined by another planar coordinate system such as rectilinear/Cartesian coordinates.) Also, receive data on the vehicle's geo-referenced location and orientation.
2. Convert sensor data to one or more independent obstacle profile candidates using a known partitioning or segmentation algorithm to group closely spaced points to form one or more distinct obstacle profile candidates at step 42.
3. For each obstacle candidate, transform the points in the obstacle profile candidate from a sensor-relative representation into a geo-referenced position in 2D space by utilizing the position and orientation information for both the vehicle (relative to the earth) and the sensor (relative to the vehicle) at step 44. The geo-reference frame is a 2-D coordinate frame (e.g., North-South, East-West) that is used to describe positions on the earth (approximately, given that a flat plane is being used to describe positions on a sphere). The particular geo-reference frame used in the current exemplary embodiment is a single UTM (Universal Transverse Mercator) zone selected appropriately for the general location of the vehicle. The transformation of each point is a sequence of geometric projections, taking the original 2-D coordinates relative to the sensor plane (angle, range), converting to 3-D relative to the vehicle (front-back/left-right/up-down relative to a reference point on the vehicle), and finally converting to 2-D relative to the earth-frame (North-South, East-West coordinates). The sensor position and orientation provide the parameters for the first projection, and the vehicle position and orientation provide the parameters for the second projection.
4. For each obstacle candidate profile, create a polygon that encloses the candidate profile using the correlation margin parameter as the outset; i.e., any point on the perimeter should be approximately that distance away from the nearest point on the candidate profile at step 46. There are several possible known geometric algorithms that can be used for creating this outset polygon including, e.g., offset polygon algorithms or parallel polygon algorithms. These polygons comprise correlation windows for the current frame.
5. As an optional step 48, run an approximation algorithm on each correlation window to reduce its point count, using the approximation epsilon parameter to control the tradeoff between accuracy and point count. The Ramer-Douglas-Peucker algorithm is one possible method of performing this approximation.
6. After the above steps have been repeated for a given number of frames, compute the polygon intersection of the area within the correlation windows for the current frame, and that for each of the previous frames as dictated by the correlation frame count parameter at step 50. It is possible (but not necessary) to perform this step using a number of intersection operations that is proportional to the logarithm of the correlation frame count, if that count is a power of two.
7. For each obstacle candidate profile, send to the output only that part of the profile that lies within the area computed in step 50, if any, at step 52.

Figure 5A:
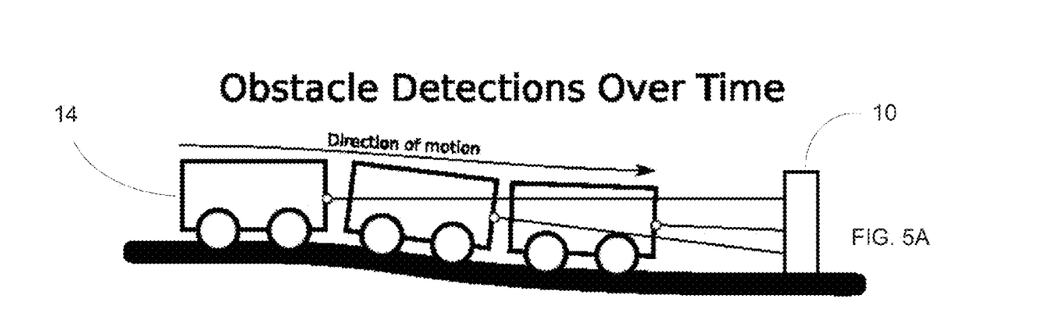
FIG. 5A is a simplified diagram illustrating detection of an obstacle by an obstacle detection system in a vehicle travelling on uneven terrain in accordance with one or more embodiments.
Figure 5B:
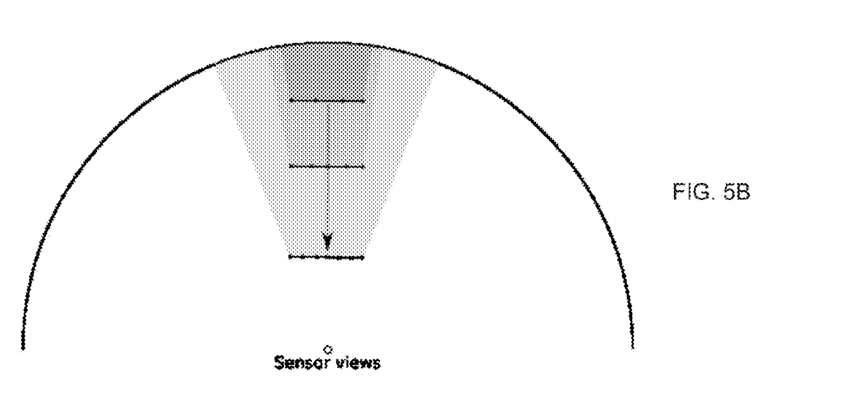
FIG. 5B is a simplified illustration of the sensor view by the obstacle detection system in FIG. 5A.
Figure 5C:
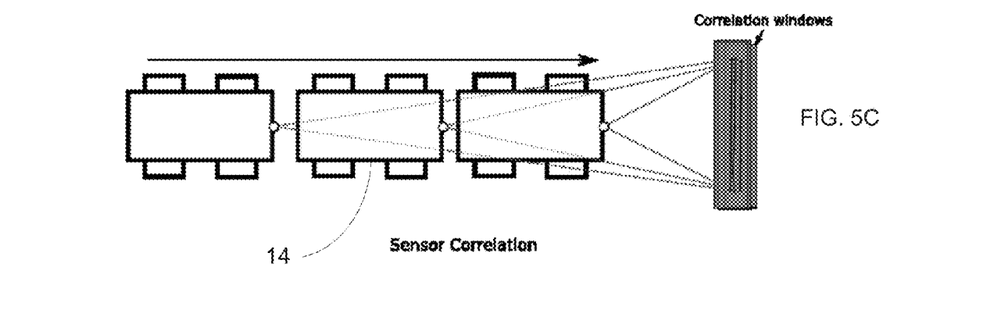
FIG. 5C is a simplified diagram illustrating sensor correlation in accordance with one or more embodiments.

As an example, consider the obstacle detection process illustrated in FIGS. 5A-C. A flat wall obstacle 10 is being perceived by a vehicle shown at different locations in three snapshots in time as the vehicle traverses uneven terrain. From the vehicle sensor's viewpoint, the obstacle's range decreases over time as shown in FIG. 5B. However, in the geo-referenced representation shown in FIG. 5C, the three obstacle profiles lie very close to each other. Assuming a correlation frame count of three, and a correlation margin that is large enough to account for sensor measurement noise, vehicle position inaccuracy, and any artifacts due to approximation, the three correlation windows overlap each other sufficiently that the one obstacle profile will be emitted largely unmodified by the filtering process at the end of the third frame. Other components of the vehicle system can then react to this obstacle detection by bringing the vehicle to a stop, or perhaps by attempting to steer around the detected extent of the obstacle. There will be no output from the filter process during the first or second frame, since the correlation window area intersection over the most recent three frames will come up empty at those intervals.

Figure 6A:
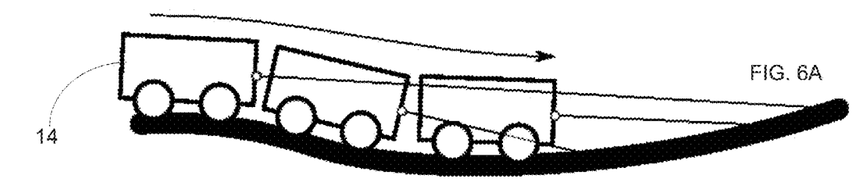
FIG. 6A is a simplified diagram illustrating ground detection by an obstacle detection system in a vehicle travelling on uneven terrain in accordance with one or more embodiments.
Figure 6B:
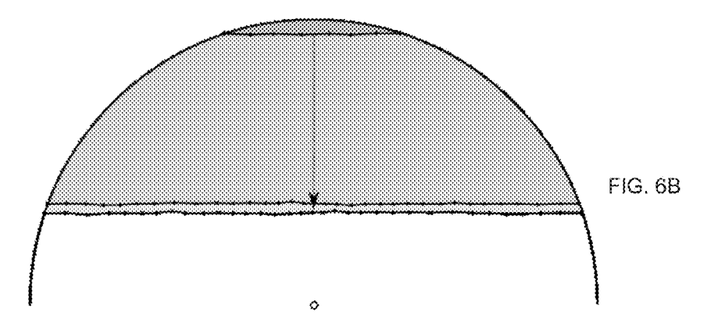
FIG. 6B is a simplified illustration of the sensor view by the obstacle detection system in FIG. 6A.
Figure 6C:
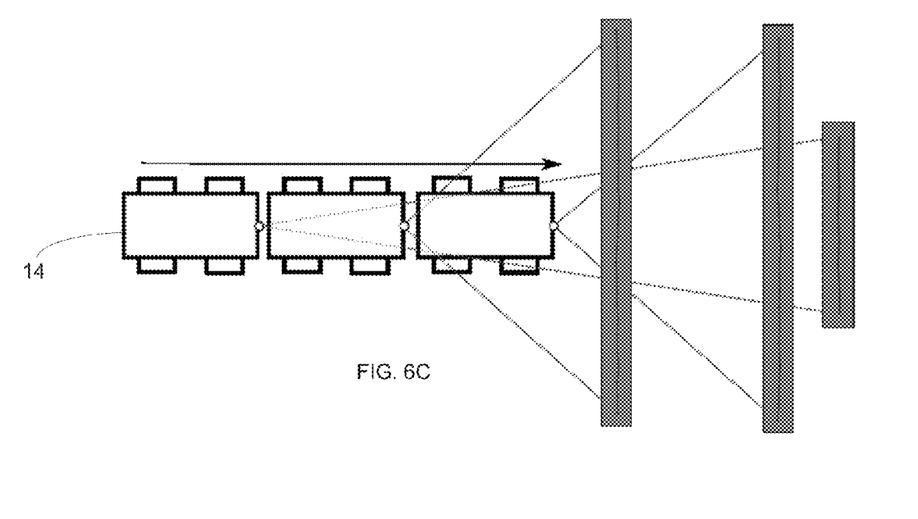
FIG. 6C is a simplified diagram illustrating sensor correlation in accordance with one or more embodiments.

As an example of ground clutter rejection, consider the example in FIGS. 6A-6C. The vehicle is traversing uneven terrain, and in the process, the sensor plane intersects the ground at various places over time as shown in FIGS. 6A and 6B. However, the geo-referenced position of these intersection profiles varies significantly as the vehicle's pitch varies, and the correlation windows fail to line up as shown in FIG. 6C. As a result, no obstacle detections will be allowed to pass through the filter process, and the vehicle will not react to these sensor returns.

The processes of the obstacle detection system described above may be implemented in software, hardware, firmware, or any combination thereof. The processes are preferably implemented in one or more computer programs executing on a programmable computer system including a processor, a storage medium readable by the processor (including, e.g., volatile and non-volatile memory and/or storage elements), and input and output devices. Each computer program can be a set of instructions (program code) in a code module resident in the random access memory of the computer system. Until required by the computer system, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the obstacle detection system may comprise one or more physical devices or machines, or virtual machines running on one or more physical machines. In addition, the obstacle detection system may comprise a cluster of computers or numerous distributed computers that are connected by the Internet or another network.

Accordingly, the foregoing description and attached drawings are by way of example only, and are not intended to be limiting.

What is claimed is:

1. A computer-implemented method of automatically detecting an obstacle from a moving vehicle using a planar sensor mounted on the vehicle, the method comprising:
   (a) receiving data at a computer system from the sensor, said data comprising a series of points defined by a planar coordinate system relative to the sensor where the sensor detected a return during a frame indicating a potential obstacle, and receiving data at the computer system indicating a geo-referenced location and orientation of the vehicle;
   (b) identifying, by the computer system, an obstacle candidate profile from the series of points;
   (c) transforming, by the computer system, the obstacle candidate profile from a sensor-relative representation to a geo-referenced representation;
   (d) repeating steps (a) to (c) for a given number of frames for said potential obstacle from different vehicle locations as the vehicle travels;
   (e) determining, by the computer system, whether or not the obstacle candidate profiles in the geo-referenced representation for each of the given number of frames substantially coincide; and
   (f) detecting, by the computer system, an obstacle when the obstacle candidate profiles in the geo-referenced representation for each of the given number of frames substantially coincide.

2. The method of claim 1, wherein (e) comprises enclosing each obstacle candidate profile in a correlation window using a given correlation margin parameter, and wherein the obstacle candidate profiles substantially coincide when at least portions of the correlation windows for the obstacle candidate profiles overlap.

3. The method of claim 2, further comprising using an approximation algorithm in each correlation window to reduce a point count of the correlation window.

4. The method of claim 1, wherein step (b) is performed using a partitioning or segmentation algorithm to group closely spaced points.

5. The method of claim 1, wherein step (c) is performed using data on the vehicle's geo-referenced location and orientation, and data on a mounting location of the sensor on the vehicle and orientation of the sensor relative to the vehicle.

6. The method of claim 1, wherein the orientation comprises pitch, roll, and yaw data.

7. The method of claim 1, wherein the vehicle location information is received from an onboard global positioning system (GPS), and the vehicle orientation information is received from an inertial measurement unit (IMU).

8. The method of claim 1, wherein the sensor comprises a LIDAR or RADAR system.

9. The method of claim 1, wherein the planar coordinate system comprises Cartesian coordinates or polar coordinates.

10. A computer system, comprising:
   at least one processor;
   memory associated with the at least one processor; and
   a program supported in the memory for automatically detecting an obstacle from a moving vehicle using a planar sensor mounted on the vehicle, the program having a plurality of instructions stored therein which, when executed by the at least one processor, cause the at least one processor to:
   (a) receive data from the sensor, said data comprising a series of points defined by a planar coordinate system relative to the sensor where the sensor detected a return during a frame indicating a potential obstacle, and receive data indicating a geo-referenced location and orientation of the vehicle;

(b) identify an obstacle candidate profile from the series of points;

(c) transform the obstacle candidate profile from a sensor-relative representation to a geo-referenced representation;

(d) repeat (a) to (c) for a given number of frames for said potential obstacle from different vehicle locations as the vehicle travels;

(e) determine, by the computer system, whether or not the obstacle candidate profiles in the geo-referenced representation for each of the given number of frames substantially coincide; and (f) detect an obstacle when the obstacle candidate profiles in the geo-referenced representation for each of the given number of frames substantially coincide.

11. The system of claim 10, wherein (d) comprises enclose each obstacle candidate profile in a correlation window using a given correlation margin parameter, and wherein the obstacle candidate profiles substantially coincide when at least portions of the correlation windows for the obstacle candidate profiles overlap.

12. The system of claim 11, wherein the program further comprises instructions using an approximation algorithm in each correlation window to reduce a point count of the correlation window.

13. The system of claim 10, wherein (b) is performed using a partitioning or segmentation algorithm to group closely spaced points.

14. The system of claim 10, wherein (c) is performed using data on the vehicle's geo-referenced location and orientation, and data on a mounting location of the sensor on the vehicle and orientation of the sensor relative to the vehicle.

15. The system of claim 10, wherein the orientation comprises pitch, roll, and yaw data.

16. The system of claim 10, wherein the vehicle location information is received from an onboard global positioning system (GPS), and the vehicle orientation information is received from an inertial measurement unit (IMU).

17. The system of claim 10, wherein the sensor comprises a LIDAR or RADAR system.

18. The system of claim 10, wherein the planar coordinate system comprises Cartesian coordinates or polar coordinates.

19. The system of claim 10, wherein the system is configured for placement in the vehicle.

* * * * *